(12) United States Patent
Hioki et al.

(10) Patent No.: US 10,665,042 B2
(45) Date of Patent: May 26, 2020

(54) VEHICLE MANAGEMENT SYSTEM, VEHICLE MANAGEMENT METHOD, COMPUTER-READABLE NON-TRANSITORY STORAGE MEDIUM

(71) Applicant: TOYOTA JIDOSHA KABUSHIKI KAISHA, Toyota-shi (JP)

(72) Inventors: Jun Hioki, Nagakute (JP); Hiroshi Igata, Yokohama (JP); Megumi Amano, Toyota (JP); Masaki Ito, Toyota (JP); Tomoaki Miyazawa, Nagoya (JP); Yuichiro Haruna, Oyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/225,227

(22) Filed: Dec. 19, 2018

(65) Prior Publication Data
US 2019/0188939 A1   Jun. 20, 2019

(30) Foreign Application Priority Data

Dec. 20, 2017  (JP) ................. 2017-244299

(51) Int. Cl.
| | |
|---|---|
| *G07C 9/00* | (2020.01) |
| *B60R 25/102* | (2013.01) |
| *G06Q 30/02* | (2012.01) |
| *B60R 25/24* | (2013.01) |
| *G07C 5/00* | (2006.01) |

(52) U.S. Cl.
CPC ........ *G07C 9/00309* (2013.01); *B60R 25/102* (2013.01); *B60R 25/241* (2013.01); *G06Q 30/0284* (2013.01); *G07C 5/008* (2013.01); *G07C 2009/00468* (2013.01)

(58) Field of Classification Search
CPC .... G07C 9/00309; G07C 5/008; B60R 25/241
USPC ....................................................... 340/5.72
See application file for complete search history.

(56) References Cited

U.S. PATENT DOCUMENTS

| | | | |
|---|---|---|---|
| 6,850,153 B1* | 2/2005 | Murakami | B60L 53/305 340/425.5 |
| 2009/0309696 A1 | 12/2009 | Tsuruta et al. | |
| 2015/0019131 A1* | 1/2015 | Basir | G01C 21/26 701/526 |

FOREIGN PATENT DOCUMENTS

| | | |
|---|---|---|
| JP | 2004-5311 | 1/2004 |
| JP | 2009-298275 | 12/2009 |
| JP | 2014-54902 | 3/2014 |

* cited by examiner

*Primary Examiner* — Vernal U Brown
(74) *Attorney, Agent, or Firm* — Oblon, McClelland, Maier & Neustadt, L.L.P.

(57) ABSTRACT

A vehicle management system includes an acquisition unit configured to acquire a manipulation list including one or a plurality of vehicle manipulations set when electronic key data of a vehicle is issued to a user device, a detection unit configured to detect that the vehicle manipulation included in the manipulation list has been performed when the vehicle is being used using the electronic key data of the user device, and a notification unit configured to notify an owner terminal related to an owner of the vehicle that the vehicle manipulation included in the manipulation list has been performed, after the detection of the detection unit.

16 Claims, 8 Drawing Sheets

VEHICLE MANAGEMENT SYSTEM, VEHICLE MANAGEMENT METHOD, COMPUTER-READABLE NON-TRANSITORY STORAGE MEDIUM

INCORPORATION BY REFERENCE

The disclosure of Japanese Patent Application No. 2017-244299 filed on Dec. 20, 2017 including the specification, drawings and abstract is incorporated herein by reference in its entirety.

BACKGROUND

1. Technical Field

The present disclosure relates to a vehicle management system, a vehicle management method, and a computer-readable non-transitory storage medium storing a program.

2. Description of Related Art

A technique that enables a mobile terminal such as a smartphone to be used as a key of a vehicle is known (Japanese Unexamined Patent Application Publication No. 2014-054902 (JP 2014-054902 A)). Using the above technique, it is possible to lend the vehicle without directly handing over the key of the vehicle. Therefore, the technique can be suitably applied to a car sharing service or a rent-a-car service. In addition, the technique can also be suitably used when the owner delivers a vehicle to a mechanic.

Japanese Unexamined Patent Application Publication No. 2004-005311 (JP 2004-005311 A) discloses that a rental fee of a vehicle is decided according to a traveling state of a lent vehicle. Specifically, JP 2004-005311 A discloses that a vehicle regularly transmits a traveling state to a center, and the center adds a use fee based on information on the traveling state and a basic fee determined irrespective of the information on the traveling state to decide a rental fee to be paid for a predetermined period for each vehicle.

Japanese Unexamined Patent Application Publication No. 2009-298275 (JP 2009-298275 A) discloses the use of an assistance key with which executable vehicle manipulations are restricted, apart from a main key.

SUMMARY

According to the technique of JP 2004-005311 A, a rental fee can be decided based on a traveling state, and the owner cannot ascertain vehicle manipulations performed during the rental of the vehicle. For example, when a vehicle is rented to another person through car sharing or the like, it is desirable for the owner to be able to ascertain whether or not an undesirable vehicle manipulation is being performed. Further, when a vehicle is delivered to a mechanic, it is desirable for the owner to be able to ascertain that a vehicle manipulation desired to be performed has been performed.

According to the technique of JP 2009-298275 A, it is possible to suppress performance of vehicle manipulations not desired to be performed. However, an additional device is needed for the vehicle in order to restrict functions, and there may be a case where it is difficult to restrict the functions. Further, there is also a case where it is not desirable for functions to be restricted. Further, with the technique of JP 2009-298275 A, it is not possible to ascertain that a vehicle manipulation desired to be performed has been performed.

The present disclosure provides a technique capable of notifying an owner that a predetermined vehicle manipulation has been performed during rental of a vehicle.

A first aspect of the present disclosure relates to a vehicle management system. The vehicle management system includes an acquisition unit, a detection unit, and a notification unit. The acquisition unit is configured to acquire a manipulation list including one or a plurality of vehicle manipulations set when electronic key data of a vehicle is issued to a user device. The detection unit is configured to detect that the vehicle manipulation included in the manipulation list has been performed when the vehicle is being used using the electronic key data of the user device. The notification unit is configured to notify an owner terminal related to an owner of the vehicle that the manipulation included in the manipulation list has been performed, after the detection of the detection unit.

Here, the vehicle manipulation included in the manipulation list may be any vehicle manipulation. For example, the vehicle manipulation included in the manipulation list may be a vehicle manipulation not desired to be performed by a user or may be a vehicle manipulation desired to be performed by the user. According to the first aspect of the present disclosure, the owner can ascertain that the vehicle manipulation not desired to be performed or the vehicle manipulation desired to be performed has actually been performed.

In the vehicle management system according to the first aspect of the present disclosure, the notification unit may be configured to perform a notification to the owner terminal each time the vehicle manipulation included in the manipulation list is performed when the vehicle is being used using the electronic key data of the user device. The vehicle management system according to the first aspect of the present disclosure may further include a storage unit configured to store the vehicle manipulation detected by the detection unit. The notification unit may be configured to collectively notify the owner terminal of the vehicle manipulations stored in the storage unit at a predetermined timing. In the vehicle management system according to the first aspect of the present disclosure, the predetermined timing may be at least one of a time when all of the vehicle manipulations included in the manipulation list have been performed, a time when the vehicle has reached a predetermined position, and a time when the vehicle management system has received a notification request. Further, when the notification is collectively performed, it is desirable for the vehicle management system to include a storage unit that stores the vehicle manipulation detected by the detection unit.

In the vehicle management system according to the first aspect of the present disclosure, the notification unit may be configured to notify the owner terminal of a time and position at which the vehicle manipulation has been performed. According to the vehicle management system of the first aspect of the present disclosure, since the owner can ascertain when and where the vehicle manipulation has been performed, a sense of security of the owner can be obtained.

The vehicle management system according to the first aspect of the present disclosure may further include a billing processing unit configured to perform a billing process on a user of the user device after the detection of the detection unit.

In the vehicle management system according to the first aspect of the present disclosure, the vehicle manipulation may include at least one of startup of a driving source, start of a movement, opening and closing of an opening and closing body of the vehicle, use of a facility inside the vehicle, and dangerous driving.

Examples of the vehicle manipulations included in the manipulation list include startup of a driving source (an engine or a motor), start of a movement, opening and closing of an opening and closing body of a vehicle, use of a facility in the vehicle, and dangerous driving. Examples of the opening and closing body of the vehicle include a door, a glove box, a bonnet, and a trunk. Examples of the facility in the vehicle include an air conditioner and an audio and video device. Examples of dangerous driving include traveling at a prescribed speed or more, a sudden braking manipulation, and a sudden steering wheel manipulation.

There is no particular limitation on what type of hardware device the vehicle management system according to the first aspect of the present disclosure is specifically configured of. The vehicle management system according to the first aspect of the present disclosure may be configured of, for example, an in-vehicle terminal included in a vehicle or may be configured of an in-vehicle terminal and one or a plurality of server devices. Further, when the vehicle management system according to the first aspect of the present disclosure is configured of a plurality of hardware devices, there is no particular limitation on which device each unit is realized by, and one unit may be realized by cooperation of the hardware devices.

A second aspect of the present disclosure relates to a vehicle management method that is performed by a vehicle management system. The vehicle management method include: acquiring a manipulation list including one or a plurality of vehicle manipulations set when electronic key data of a vehicle is issued to a user device; detecting that the vehicle manipulation included in the manipulation list has been performed when the vehicle is being used using the electronic key data of the user device; and notifying an owner terminal related to an owner of the vehicle that the manipulation included in the manipulation list has been performed, after the detection.

A third aspect of the present disclosure relates to a computer-readable non-transitory storage medium storing a program. The program causes a computer to execute: acquiring a manipulation list including one or a plurality of vehicle manipulations set when electronic key data of a vehicle is issued to a user device, detecting that the vehicle manipulation included in the manipulation list has been performed when the vehicle is being used using the electronic key data of the user device, and notifying an owner terminal related to an owner of the vehicle that the manipulation included in the manipulation list has been performed, after the detection.

According to the aspects of the present disclosure, it is possible to notify the owner that a predetermined vehicle manipulation has been performed during rental of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

System Overview

The first embodiment is a vehicle rental system that lends a vehicle by issuing an electronic key of a vehicle (hereinafter simply referred to as an "electronic key") to a mobile terminal such as a smartphone. The present embodiment is directed to a car sharing service or a rent-a-car service that lend vehicles in exchange for consideration.

Figure 1:
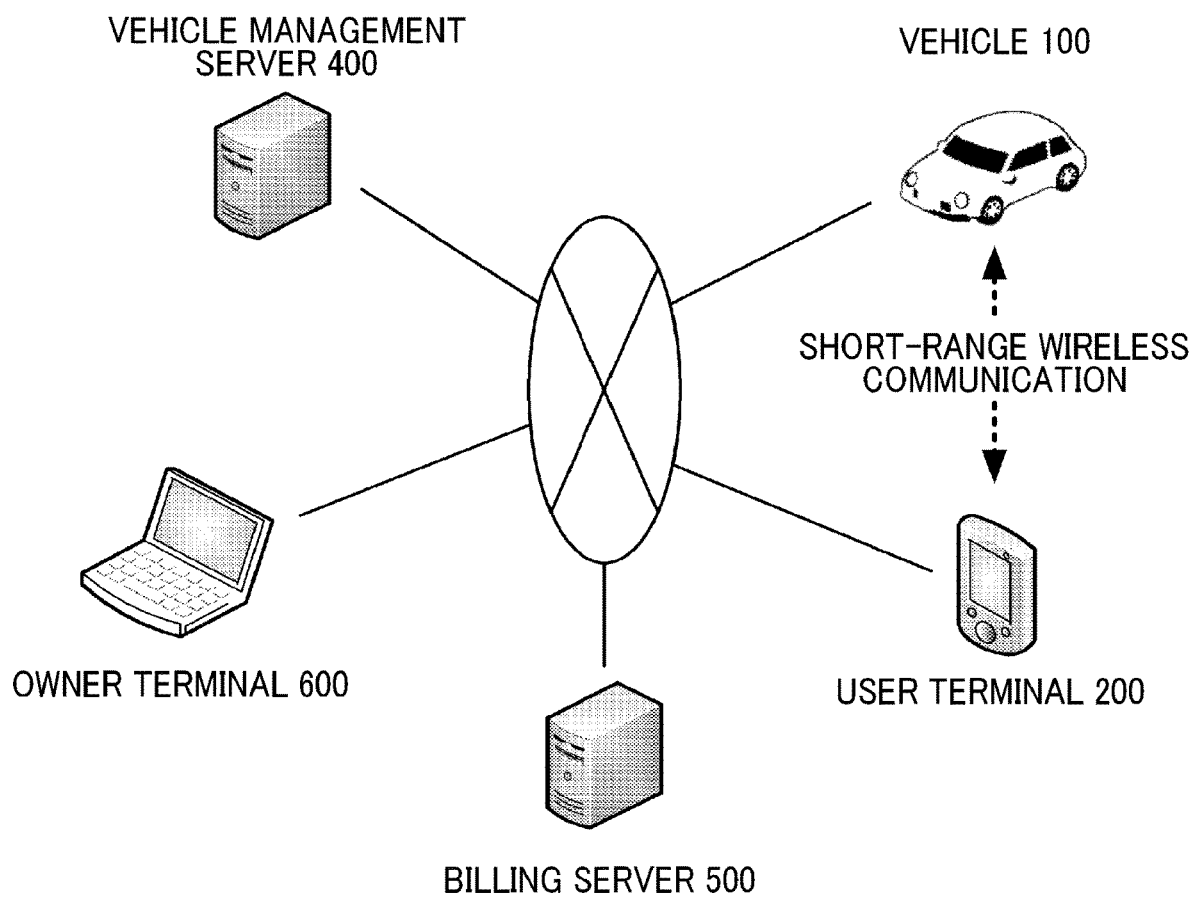
FIG. 1 is a system overview diagram of a vehicle rental system according to a first embodiment.

FIG. 1 is a diagram illustrating a system overview of a vehicle rental system according to the present embodiment. The vehicle rental system according to the present embodiment includes a vehicle 100, a user terminal 200, a vehicle management server 400, a billing server 500, and an owner terminal 600.

Figure 2:
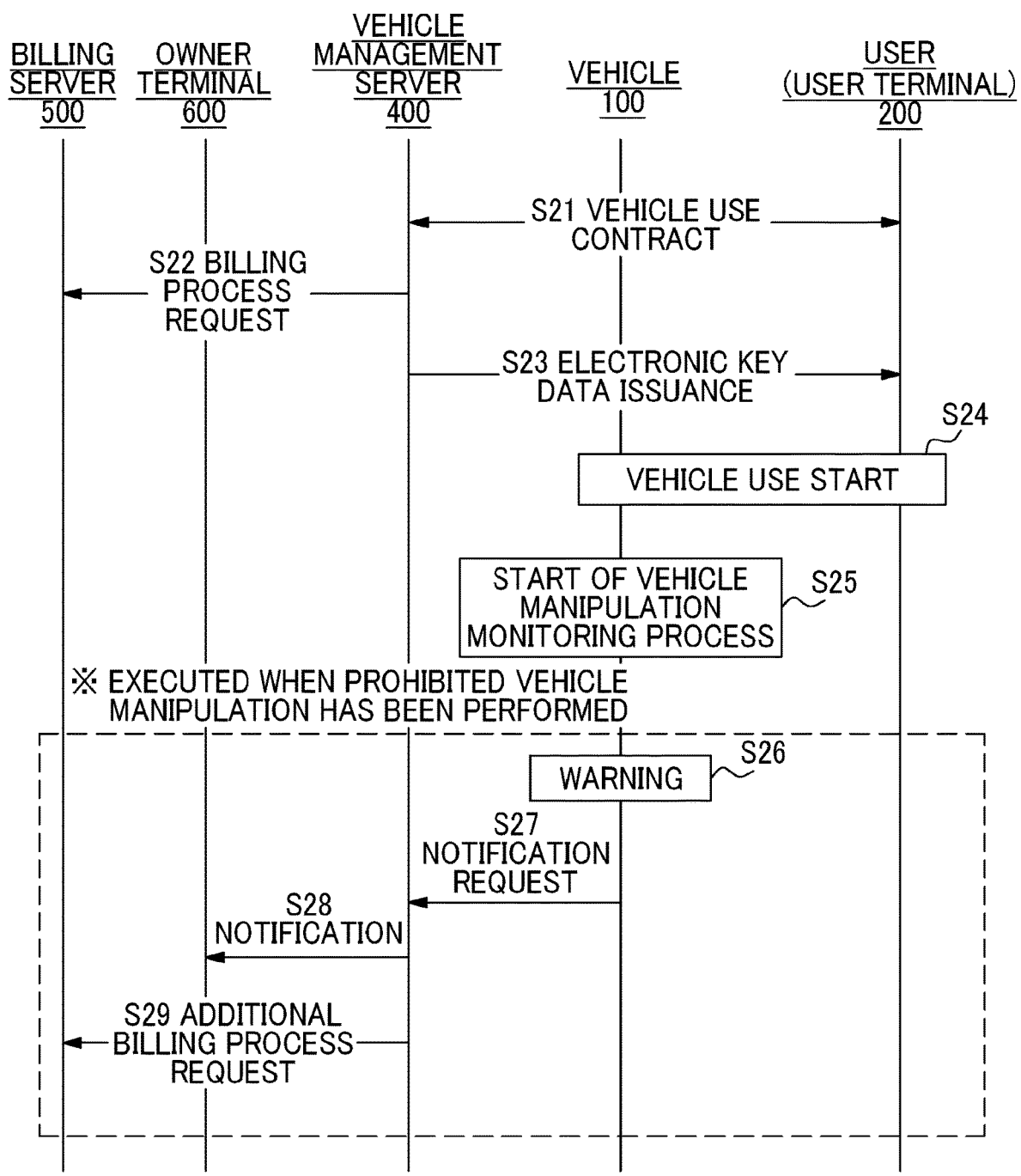
FIG. 2 is a sequence diagram illustrating a flow of an overall process in the vehicle rental system according to the first embodiment.

FIG. 2 is a diagram illustrating a flow of an overall process in the first embodiment. First, in step S21, a user accesses the vehicle management server 400 using the user terminal 200 and makes a use contract (rental contract) for the vehicle 100. For example, the use contract includes use conditions (rental conditions) such as a use time, a use range, billing, and prohibited vehicle manipulations, or user information such as a name of a user, an address of the user, and payment information. In the first embodiment, how the use conditions are decided is not particularly limited.

In step S22, the vehicle management server 400 requests the billing server 500 to perform a billing process for the user based on the use contract. The billing server 500 executes a billing process for the user based on the request.

When payment by the user is completed, the vehicle management server 400 issues electronic key data to the user terminal 200 in step S23. In step S24, the user starts up an engine of the vehicle 100 using an electronic key of the user terminal 200 to start the use of the vehicle.

In step S25, a process of monitoring vehicle manipulations in the vehicle 100 is started. More specifically, the vehicle 100 monitors whether or not a manipulation performed with respect to the vehicle 100 corresponds to the prohibited vehicle manipulation determined at the time of the use contract. When the prohibited vehicle manipulation has been performed with respect to the vehicle 100, step S26 and subsequent processes (processes surrounded by a dotted line) are performed.

In step S26, the vehicle 100 issues a warning for notifying that the prohibited vehicle manipulation has been performed, to the driver via an in-vehicle device. Further, in step S27, the vehicle 100 requests the vehicle management server 400 to notify the owner that the prohibited vehicle manipulation has been performed. In step S28, the vehicle management server 400 notifies the owner terminal 600 that the prohibited vehicle manipulation has been performed with respect to the vehicle 100 in response to the request from the vehicle 100. In step S29, in response to the fact that the prohibited vehicle manipulation has been performed, the vehicle management server 400 requests the billing server 500 for an additional billing process.

As described above, when the prohibited vehicle manipulation has been performed with respect to the vehicle 100, the owner terminal 600 is notified of the fact, and therefore, the owner of the vehicle 100 can ascertain whether or not the vehicle 100 is appropriately used. In addition, when the prohibited vehicle manipulation has been performed, a warning, a notification to the owner, or an additional billing is performed, and therefore, the user can be urged to use the vehicle 100 appropriately.

Functional Configuration

Figure 3:
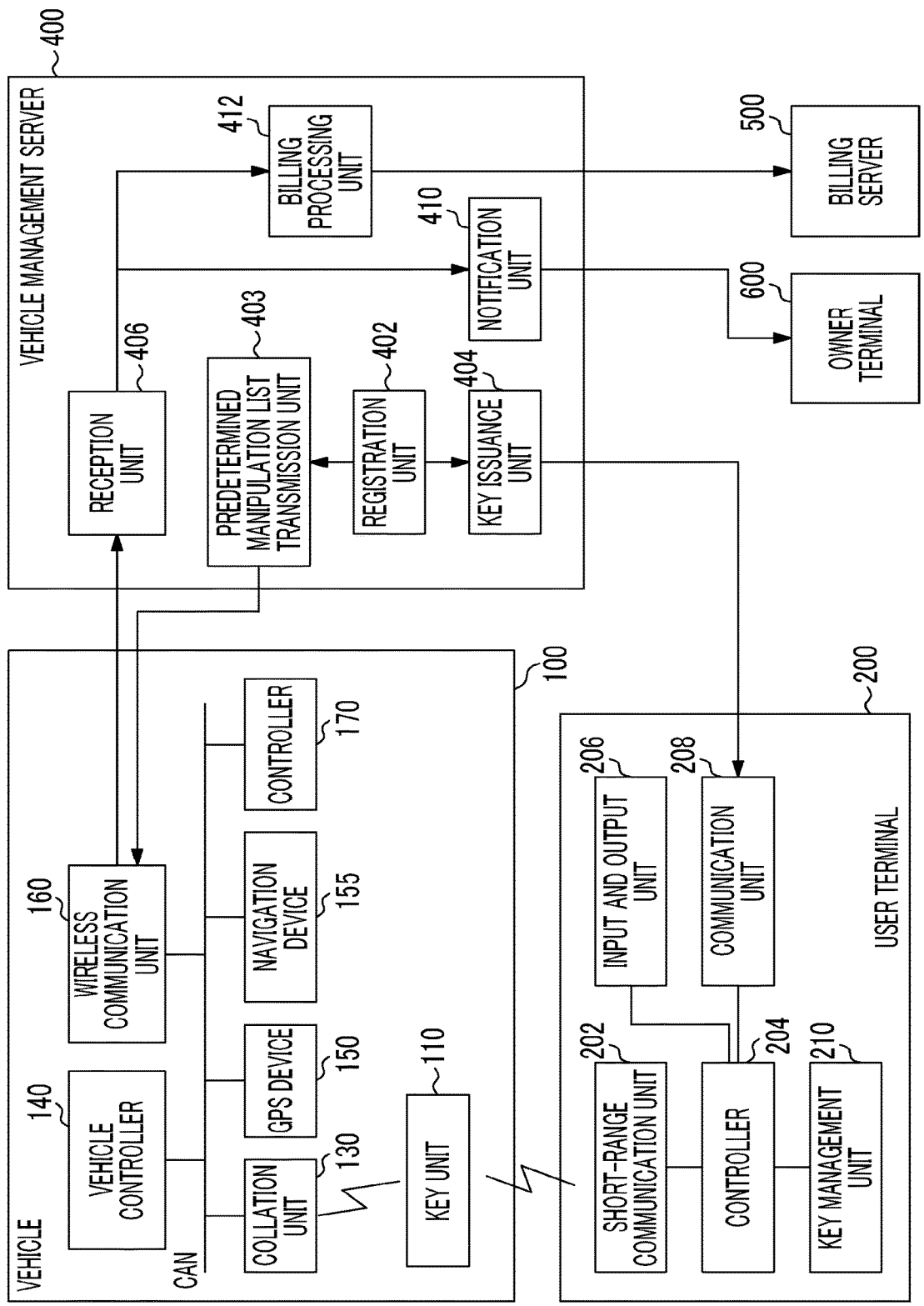
FIG. 3 is a block diagram schematically illustrating an example of components included in the vehicle rental system.

FIG. 3 is a functional block diagram of each device constituting the vehicle rental system according to the present embodiment.

Vehicle 100

The vehicle 100 includes a key unit 110, a collation unit 130, a vehicle controller 140, a global positioning system (GPS) device 150, a navigation device 155, a wireless communication unit 160, and a controller 170. It should be noted that the controller 170, the collation unit 130, the vehicle controller 140, the GPS device 150, the navigation device 155, and the wireless communication unit 160 are connected in a wired manner via a vehicle network such as a controller area network (CAN). The key unit 110 is connected to the collation unit 130 through wireless communication. The vehicle 100 may be a gasoline vehicle or an electric vehicle.

The key unit 110 includes a wireless interface that is the same as that of a smart key (a mobile device of a smart entry system). By performing communication with the collation unit 130, the key unit 110 can perform locking and unlocking of the vehicle or other vehicle manipulations without using a physical key. Further, the key unit 110 performs short-range wireless communication with the user terminal 200 and decides whether or not the key unit 110 serves as a key (a vehicle manipulation device) of the vehicle 100 based on a result of authenticating the user terminal 200. That is, the user of the system can perform locking and unlocking the vehicle or other vehicle manipulations by manipulating the user terminal 200 from the outside of the vehicle 100.

The key unit 110 performs short-range wireless communication with the user terminal 200 using a Bluetooth (registered trademark) Low Energy standard (hereinafter referred to as BLE). A wireless communication standard such as Near Field Communication (NFC), Ultra-wideband (UWB), or WiFi (registered trademark) may be used. The key unit 110 receives electronic key data from the user terminal 200, and transmits a key ID to the collation unit 130 when authentication thereof is successful. It is assumed that the key ID has been stored as unique authentication information in the key unit 110 and a process for registration in the collation unit 130 has been performed in advance.

The key unit 110 may ascertain which user is going to use the vehicle 100 from the electronic key data transmitted from the user terminal or data incidental to the electronic key data transmitted from the user terminal, and notify the controller 170 of a result of the ascertaining via the collation unit 130.

The collation unit 130 is connected to the key unit 110 through wireless communication. A wireless communication standard is not particularly limited, but in the first embodiment, communication from the collation unit 130 to the key unit 110 is performed using radio waves in a low frequency (LF) band, and communication from the key unit 110 to the collation unit 130 is performed using radio waves in a radio frequency (RF) band. The collation unit 130 regularly transmits a polling signal in the LF band. The key unit 110 transmits a key ID in response to the polling signal. The collation unit 130 determines whether or not the received key ID matches a registered key ID. When the IDs match, the collation unit 130 notifies the vehicle controller 140 that the received key ID matches the registered key ID, making it possible to cause the vehicle to perform a predetermined operation.

The vehicle controller 140 is a functional unit that performs state detection or control of various devices of the vehicle 100. Devices that are targets of the state detection or the control that is performed by the vehicle controller 140 include an engine, an accelerator, a brake, a steering wheel, lights, direction indicators, wipers, an air conditioner, doors, a trunk, a bonnet, a glove box, and the like. It should be noted that with respect to some (for example, the glove box) of the devices, the vehicle controller 140 may acquire solely states of some devices and may be unable to control the devices. The vehicle controller 140 may also acquire information on the vehicle such as a position, an acceleration, speed, and an azimuth from a GPS device, an acceleration sensor, a speed sensor, an azimuth angle sensor, and the like.

The GPS device 150 acquires position information by receiving the GPS satellite signal. As long as the position information can be acquired, the vehicle 100 may use a positioning device based on a Global Navigation Satellite System (GNSS) other than the GPS or may use a positioning device based on base station positioning.

The navigation device 155 performs search for a route to a destination, a display of the route, and the like. The navigation device 155 includes a display or a speaker and is configured to be able to perform notification to the user.

The wireless communication unit 160 is a communication unit for connecting the vehicle 100 to a network. In the first embodiment, the wireless communication unit 160 can perform communication with another device (for example, the vehicle management server 400) via the network using a mobile communication service such as 3G (3 Generation) or Long Term Evolution (LTE).

The controller 170 serves a manipulation of the entire vehicle 100. The controller 170 determines whether or not a manipulation performed with respect to the vehicle 100 corresponds to the prohibited vehicle manipulation that is transmitted from the vehicle management server 400. When the manipulation performed with respect to the vehicle 100 corresponds to the prohibited vehicle manipulation, the controller 170 performs, for example, warning the user, a notification to the owner terminal 600, and an additional billing process. Details will be described below. The controller 170 includes a microprocessor, and a memory that stores a program, and the following functions are provided by the microprocessor executing the program. However, some or all of the functions of the controller 170 may be realized by a hardware circuit such as an application specific integrated circuit (ASIC) or a field programmable gate array (FPGA).

User Terminal 200

The user terminal 200 will be described. The user terminal 200 is a device that is used by the user. Therefore, in the present specification, the user terminal 200 may also be referred to as a user device.

The user terminal 200 is a small computer such as a wearable computer, such as a smartphone, a mobile phone, a tablet terminal, a personal digital assistant, or a smart watch. The user terminal 200 includes a short-range communication unit 202, a controller 204, an input and output unit 206, a communication unit 208, and a key management unit 210.

The short-range communication unit 202 is means for performing short-range wireless communication with the key unit 110. As described above, BLE communication is used in the first embodiment. The controller 204 is a microprocessor and controls the entire device by executing a program stored in a memory. The input and output unit 206 is a touch screen and receives an output of an image or a touch input from the user. The communication unit 208 is a communication unit for connecting the user terminal 200 to the network, and uses a mobile communication service such as 3G or LTE. The key management unit 210 stores the electronic key data issued from the vehicle management server.

The user of the user terminal 200 manipulates the input and output unit 206 to receive the electronic key data of the vehicle 100 from the vehicle management server 400. The electronic key data transmitted from the vehicle management server 400 is stored in the key management unit 210. When the user of the user terminal 200 uses the vehicle 100, the user performs a predetermined input manipulation in the vicinity of the vehicle 100 (within a communication range of the short-range wireless communication) and transmits the electronic key data to the key unit 110 of the vehicle 100. Accordingly, the user can use the vehicle 100.

The user terminal 200 may transmit the electronic key data together with a user ID when the user terminal 200 transmits the electronic key data to the key unit. Accordingly, the vehicle 100 can ascertain which user is using the vehicle 100. The user terminal 200 may notify the vehicle management server 400 that the use of the vehicle 100 has been started through wireless communication when the user terminal 200 has started the use of the vehicle 100 using the electronic key data. The vehicle management server 400 may notify the vehicle 100 which user is using the vehicle through wireless communication. Further, the user terminal 200 may periodically transmit position information that is obtained from a GPS device (not illustrated) included in the user terminal 200 to the vehicle management server 400 during the use of the vehicle 100.

Vehicle Management Server 400

Next, the vehicle management server (a key management device) 400 will be described. The vehicle management server 400 is a computer including a microprocessor, a storage device, an input and output device, and a communication device, and the following functions are realized by the microprocessor executing a program. However, some or all of the functions may be realized by a hardware circuit such as an application specific integrated circuit (ASIC) or a field programmable gate array (FPGA). The vehicle management server 400 does not have to be realized by one computer, but may be realized by cooperation of a plurality of computers.

The vehicle management server 400 includes a registration unit 402, a predetermined manipulation list transmission unit 403, a key issuance unit 404, a reception unit 406, a notification unit 410, and a billing processing unit 412.

The registration unit 402 acquires the rental conditions when the vehicle 100 is lent to the user. The rental conditions include a use time, a use range, a use fee, and prohibited vehicle manipulations of the vehicle 100. The prohibited vehicle manipulations are manipulations that the user is prohibited to perform with respect to the vehicle 100 as a contract. Examples of the prohibited vehicle manipulations include one or a plurality of opening of a glove box, a bonnet, a trunk, or the like, use of an air conditioner or an audio and video device (the use itself may be prohibited or the use with settings that have not been prescribed may be prohibited), and dangerous driving (traveling at a prescribed speed or higher, a sudden braking manipulation, a sudden steering wheel manipulation, and the like). The registration unit 402, for example, can acquire the rental conditions as part of the use contract from the user terminal 200. Further, when the user makes the use contract using a reservation server other than the vehicle management server 400, the registration unit 402 may acquire the rental conditions from the reservation server. The registration unit 402 stores the acquired prohibited vehicle manipulations in a storage unit (not illustrated) as a predetermined manipulation list in association with the user or the user terminal 200. The prohibited vehicle manipulation may be determined in advance, and may not be acquired from an external device in the above case.

The predetermined manipulation list transmission unit 403 transmits the predetermined manipulation list to the vehicle 100 through wireless communication. The transmission of the predetermined manipulation list may be performed before the user starts the use of the vehicle 100. For example, the transmission of the predetermined manipulation list may be performed when the user reserves the vehicle 100 or may be performed at the start of the use of the vehicle 100. Further, the prohibited vehicle manipulation may be determined in advance. In the above case, the prohibited vehicle manipulation list may be stored in the vehicle 100.

The key issuance unit 404 is a functional unit that issues electronic key data of the vehicle 100 to the user device based on an electronic key issuance request from the user device. The key issuance unit 404 performs the issuance of the electronic key data to the user terminal 200 of the user that has made the use contract for the vehicle 100. It should be noted that the electronic key does not have to be issued immediately after the use contract, and an issuance timing is optional as long as the timing is before a use start time.

In the first embodiment, the electronic key means electronic data that can be used to control the vehicle 100 using the user device when the user device possesses the electronic key. However, the electronic key can be invalidated, and control of the vehicle 100 cannot be performed with the invalidated electronic key. The electronic key is electronic data. Therefore, in this specification, the electronic key is also referred to as electronic key data, both of which are interchangeable.

The key issuance unit 404 sets an expiration date of the electronic key and issues the electronic key to the user device. The expiration date is preset, for example, at the time of registration. The electronic key may include a valid/invalid flag indicating whether the electronic key is valid or invalid.

The reception unit 406 receives various requests from the vehicle 100 through wireless communication. An example of the request from the vehicle 100 is a request for notifying the owner terminal 600 that the prohibited vehicle manipulation has been performed in the vehicle 100. Another example of the request from the vehicle 100 is a request for performing a billing process for a user.

The notification unit 410 transmits notification information to the owner terminal 600 of the vehicle 100 based on the request from the vehicle 100. Although the notification to the owner terminal 600 is performed immediately when the request is received from the vehicle 100 in the first embodiment, a notification timing may be later.

The billing processing unit 412 requests the billing server 500 to perform the billing process for the user. The billing processing unit 412 requests the billing process at a point in time when the contract with the user is made and also requests the billing process even when the user has performed the prohibited vehicle manipulation. In the first embodiment, the billing process caused by performing the prohibited vehicle manipulation is performed based on a request from the vehicle 100.

Billing Server 500

Next the billing server 500 will be described. Since a hardware configuration of the billing server 500 is the same as that of the vehicle management server 400, repeated description will be omitted. The billing server 500 and the vehicle management server 400 may be realized by the same computer. The billing server 500 acquires a charging target person and the amount to be charged, and charges the charging target person for the amount to be charged.

Owner Terminal 600

The owner terminal 600 is a terminal (a computer) that is manipulated by the owner of the vehicle 100. The owner terminal may be a mobile computer such as a smartphone or a laptop computer or may be a stationary computer such as a desktop computer. When the owner terminal 600 receives a notification indicating that the prohibited vehicle manipulation has been performed with respect to the vehicle 100 from the notification unit 410 of the vehicle management server 400, the owner terminal 600 notifies the owner that the prohibited vehicle manipulation has been performed via a display or a speaker.

Controller 170 of Vehicle 100

The controller 170 serves to control the entire vehicle 100 and particularly monitors whether or not a manipulation performed with respect to the vehicle 100 corresponds to the prohibited vehicle manipulation transmitted from the vehicle management server 400. The monitoring process is performed when the vehicle 100 is used by the user for which the prohibited vehicle manipulations have been set.

Figure 4:
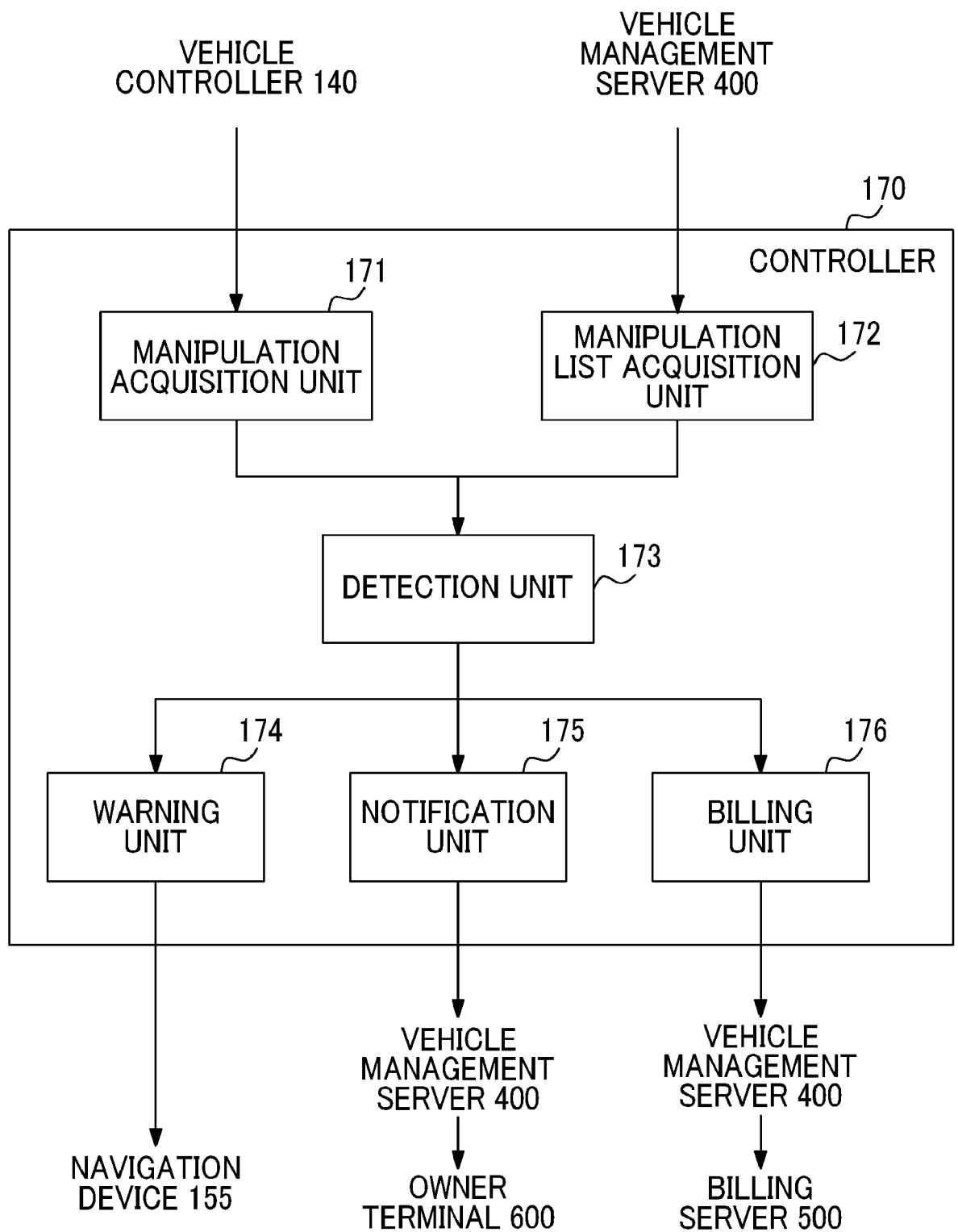
FIG. 4 is a block diagram of functions of a controller of the vehicle.

FIG. 4 is a block diagram illustrating functions that provided by the controller 170. By the microprocessor executing the program, the controller 170 functions as a manipulation acquisition unit 171, a manipulation list acquisition unit 172, a detection unit 173, a warning unit 174, a notification unit 175, and a billing unit 176.

The manipulation acquisition unit 171 acquires information on the vehicle manipulation performed with respect to the vehicle 100 from the vehicle controller 140. The information on the vehicle manipulation includes information indicating that a device mounted in the vehicle is used or information on a current state of the vehicle or the device mounted in the vehicle. For example, the manipulation acquisition unit 171 may acquire sensor information indicating that the glove box, the trunk, or the bonnet is opened, and may acquire a speed, an acceleration, a yaw rate, or the like of the vehicle 100.

The manipulation list acquisition unit 172 acquires a list of prohibited vehicle manipulations (a predetermined manipulation list) which is part of the use contract for the vehicle 100 from the vehicle management server 400 through wireless communication. When content of the prohibited vehicle manipulations is different according to users, the manipulation list acquisition unit 172 needs to acquire the prohibited vehicle manipulation list according to the user who is actually using the vehicle 100. The manipulation list acquisition unit 172 stores the received predetermined manipulation list in a storage unit (not illustrated). After the predetermined manipulation list has been acquired, the controller 170 may perform a process with reference to the predetermined manipulation list stored in the vehicle 100.

The detection unit 173 determines whether or not the manipulation (that is, the prohibited vehicle manipulation) included in the predetermined manipulation list has been performed with respect to the vehicle 100. Specifically, the detection unit 173 determines whether or not the vehicle manipulation acquired from the manipulation acquisition unit 171 is the manipulation included in the predetermined manipulation list. For example, when the prohibited vehicle manipulation is opening of the glove box, the detection unit 173 determines that the prohibited vehicle manipulation has been performed when information indicating that the glove box is opened is acquired from the manipulation acquisition unit 171. When the prohibited vehicle manipulation is a sudden braking manipulation, the detection unit 173 determines that the prohibited vehicle manipulation has been performed when the amount of brake depression obtained from a brake sensor is equal to or larger than a prescribed value or when a deceleration is equal to or greater than a threshold value.

When the prohibited vehicle manipulation has been detected, the controller 170 starts at least one of a warning to an in-vehicle user, a notification to the owner, and an additional billing process for the user. The above-described processes may be performed at the same time or solely the warning may first be performed, and when the prohibited vehicle manipulation continues, the notification to the owner or the additional billing process may be performed. In addition, the controller 170 may acquire a position or time of the vehicle 100 when the prohibited vehicle manipulation has been performed and cause the position or the time to be included in the notification to the owner.

The warning unit 174 requests the navigation device 155 to warn that prohibited vehicle manipulation is being performed. Content of the warning may include content of the prohibited vehicle manipulation and a request to stop the prohibited vehicle manipulation. Further, the warning may include a notification to the owner being (having been) performed or an additional billing process being (having been) performed.

The notification unit 175 requests the vehicle management server 400 to notify the owner terminal 600 that the prohibited vehicle manipulation has been performed. Content of the notification may include the prohibited vehicle manipulation, information on a user who uses the vehicle, and a position and time at which the prohibited vehicle manipulation has been performed.

The billing unit 176 requests the vehicle management server 400 to request the billing server 500 for additional billing as a penalty for the prohibited vehicle manipulation being performed. The amount to be charged is assumed to be determined in advance at the time of making the use contract for the vehicle 100.

Process

Vehicle Rental Process

Figure 5:
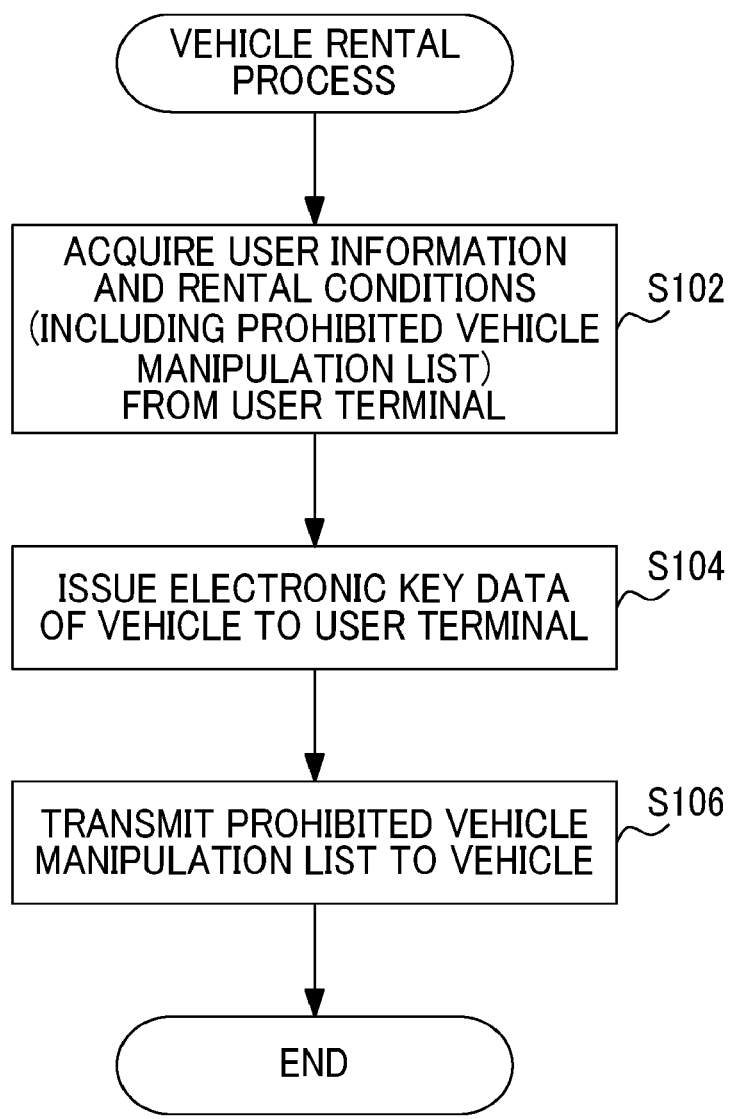
FIG. 5 is a flowchart showing a flow of a vehicle rental process of a vehicle management server according to the first embodiment.

A process of issuing an electronic key of the vehicle 100 to the user terminal 200, that is, a process of lending the vehicle 100 will be described with reference to FIG. 5. Each process illustrated in FIG. 5 is executed by the vehicle management server 400.

In step S102, the registration unit 402 acquires user information of a user who uses the vehicle 100 and rental conditions at the time of using the vehicle 100 from the user terminal 200. It should be noted that the vehicle management server 400 may acquire content of the use contract when the user uses the vehicle 100, and the registration unit 402 may extract the rental conditions and the user information included in the use contract. The rental conditions include a time for which the vehicle 100 can be used, a range in which the vehicle 100 can be used, a fee to be paid as compensation, and a list of prohibited vehicle manipulations. The user information includes a name of a user, an address of the user, payment information, and the like. The acquired information described above is stored in the storage unit.

In step S104, the key issuance unit 404 issues electronic key data to the user terminal 200. Here, although an example in which the terminal used for the use contract is the same as the terminal that is an electronic key data issuance destination is used for description, the above-described terminals may be different.

In step S106, the predetermined manipulation list transmission unit 403 transmits a list of prohibited vehicle manipulations to the vehicle 100. The transmitted prohibited vehicle manipulation list (a predetermined manipulation list) is received by the manipulation list acquisition unit 172 of the vehicle 100 and stored in the storage unit in the vehicle 100.

Vehicle Monitoring Process

A vehicle monitoring process of the vehicle 100 while the user renting the vehicle 100 is using the vehicle 100 will be described with reference to FIG. 6. A process of the flowchart illustrated in FIG. 6 is executed when the renting user (that is, a user for which prohibited vehicle manipulations are set) is using the vehicle 100 using the electronic key data of the user terminal 200.

Figure 6:
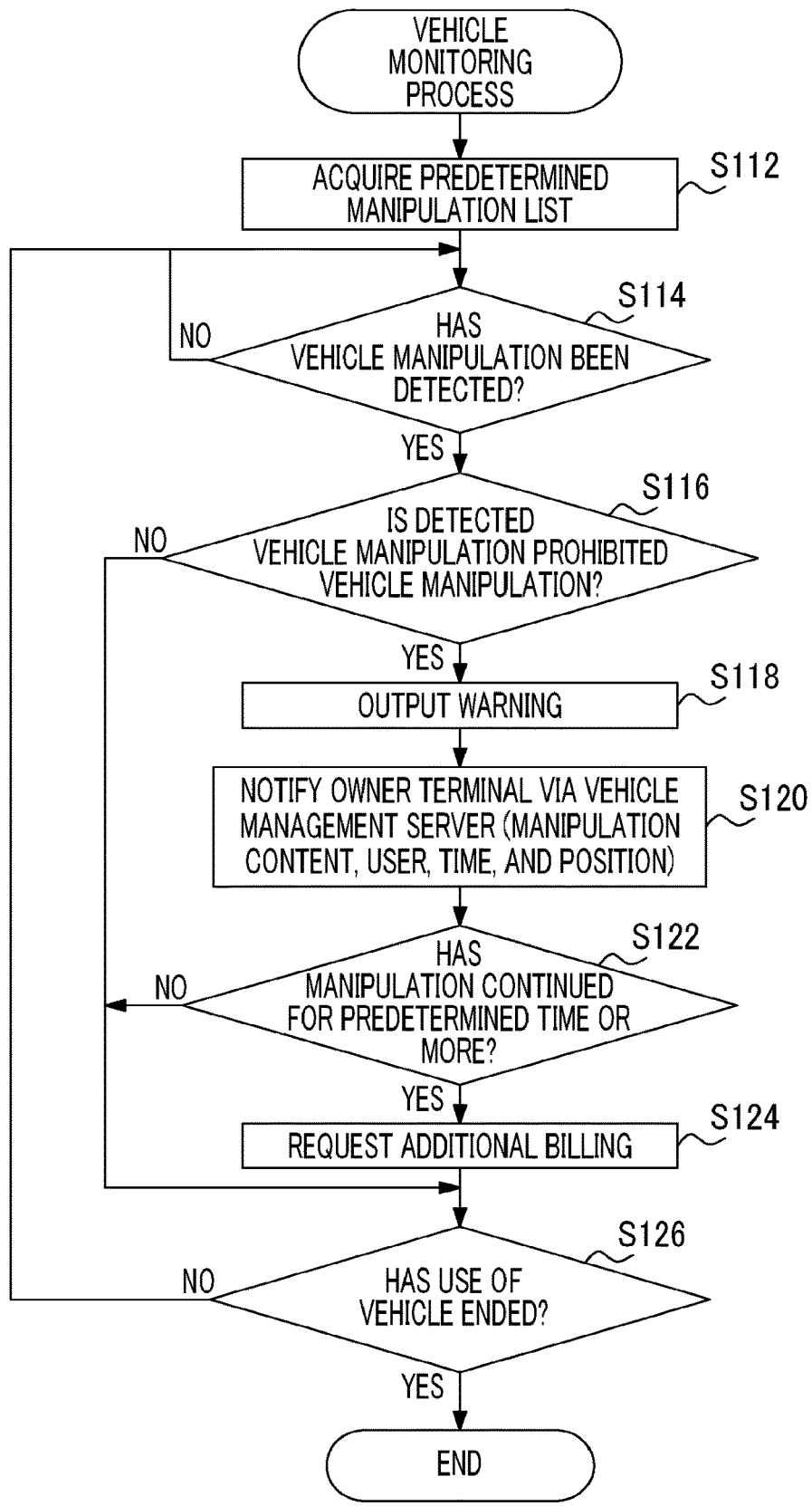
FIG. 6 is a flowchart showing a flow of a vehicle monitoring process of a vehicle according to the first embodiment.

It should be noted that the flowchart of FIG. 6 is an example of a case where the notification to the owner is performed immediately when the prohibited vehicle manipulation has been detected, and additional billing is performed when the prohibited vehicle manipulation has continued for a predetermined time (or predetermined number of times) or more.

When the user starts use of the vehicle 100, the manipulation list acquisition unit 122 acquires the predetermined manipulation list (prohibited vehicle manipulation list) set for the user in step S112. When the prohibited vehicle manipulation list is not stored in the storage unit of the vehicle 100, the manipulation list acquisition unit 122 acquires the prohibited vehicle manipulation list from the vehicle management server 400 through wireless communication. When the prohibited vehicle manipulation list is stored in the storage unit of the vehicle 100, the manipulation list acquisition unit 122 may read the prohibited vehicle manipulation list from the storage unit.

In step S114, the controller 170 waits for the vehicle manipulation to be detected from the manipulation acquisition unit 171. When any vehicle manipulation is detected, the process proceeds to step S116.

In step S116, the detection unit 173 determines whether the vehicle manipulation detected in step S114 is the manipulation included in the predetermined manipulation list (in other words, whether or not the vehicle manipulation corresponds to the prohibited vehicle manipulation). When the performed vehicle manipulation is the manipulation included in the predetermined manipulation list, the process proceeds to step S118, and otherwise, to step S126.

In step S118, the warning unit 174 outputs a warning indicating that the prohibited vehicle manipulation is being performed, to the user inside the vehicle via the navigation device 155. The warning includes content of the prohibited vehicle manipulation, a request to stop the vehicle manipulation, the owner being (having been) notified that the vehicle manipulation has been performed, and additional billing being performed when the prohibited vehicle manipulation continues.

In step S120, the notification unit 175 notifies the owner terminal 600 that the prohibited vehicle manipulation has been performed, via the vehicle management server 400. The notification includes content of the performed prohibited vehicle manipulation, a user who has performed the prohibited vehicle manipulation, and a position and time at which the prohibited vehicle manipulation has been performed.

In step S122, the controller 170 determines whether or not a time for which prohibited vehicle manipulation is performed is equal to or longer than a predetermined time. When the time for which the prohibited vehicle manipulation is performed is equal to or longer than the predetermined time, the process proceeds to step S124, and when the time for which the prohibited vehicle manipulation is performed is not equal to or longer than the predetermined time, the process proceeds to step S126. It should be noted that the billing process may be performed on condition that the prohibited vehicle manipulation has been executed a predetermined number of times or more, apart from the condition that the prohibited vehicle manipulation is performed for a time equal to or longer than the predetermined time.

In step S124, the billing unit 176 requests the vehicle management server 400 to request the billing server 500 for additional billing. It should be noted that when the additional billing has been performed, the user may be notified that the additional billing has been performed.

In step S126, a determination is made as to whether or not the use of the vehicle by the user has ended. When the use of the vehicle is continuing (NO in S126), the process returns to step S114. On the other hand, when the use of the vehicle has ended (YES in S126), the controller 170 ends the vehicle monitoring process.

Advantageous Effects of First Embodiment

According to the first embodiment, in the vehicle rental system that issues the electronic key data and lends the vehicle, the owner is notified that the prohibited vehicle manipulation is performed when the prohibited vehicle manipulation is performed. Therefore, the owner can ascertain whether or not the lent vehicle is appropriately used. In addition, when the prohibited vehicle manipulation is performed, the notification to the owner or the additional billing is performed, and therefore, it is possible to suppress the user performing the prohibited vehicle manipulations.

Modification Example 1-1

Although the additional billing process is performed when the prohibited vehicle manipulation has continued for a predetermined time or more in the above description (particularly, in FIG. 6), the additional billing process may be executed immediately after the prohibited vehicle manipulation is detected. The notification to the owner terminal may be executed when the prohibited vehicle manipulation has continued for a predetermined time, instead of being executed immediately after the prohibited vehicle manipulation is detected.

Modification Example 1-2

Although the notification to the owner terminal is performed each time the prohibited vehicle manipulation is detected in the above embodiment, the notification may be performed collectively at a predetermined timing. In order to do as described above, when the prohibited vehicle manipulation is detected, the controller 170 stores the prohibited vehicle manipulation in the storage unit in the vehicle 100 in association with the content of the manipulation, a position of the vehicle, and a time. When a predetermined timing is reached, the controller 170 collectively notifies the owner terminal 600 of the content of the prohibited vehicle manipulation stored in the storage unit together with the position of the vehicle and the time.

The predetermined timing may be optional. For example, the predetermined timing can be set as a point in time when the use of the vehicle by the user has ended, a point in time when the vehicle 100 has reached a predetermined position (a destination or the like), or a point in time when the owner transmits a request from the owner terminal.

Modification Example 1-3

Although the determination as to whether or not the manipulation performed with respect to the vehicle 100 corresponds to the prohibited vehicle manipulation is performed by the vehicle 100 in the above embodiment, the determination may be performed by the vehicle management server 400. In order to do as described above, a vehicle manipulation detected within the vehicle 100 may be transmitted to the vehicle management server 400 through wireless communication.

Further, the process described above may be executed as a whole of the system, and specific assignment of the process is not particularly limited. For example, a part of the process may be executed using a server device other than that described above.

Second Embodiment

System Overview

The first embodiment is an example in which the vehicle management system has been applied to a car sharing service, whereas the second embodiment is an example in which the vehicle management system has been applied to a vehicle maintenance service. In the vehicle maintenance service according to the present embodiment, when an owner requests a vehicle mechanic for maintenance, electronic key data is transmitted to a mobile terminal of the mechanic, and the mechanic picks up a vehicle from a house of the owner using the electronic key data and performs maintenance work.

Since a basic configuration is the same as that in the first embodiment, differences will mainly be described. The configuration of the entire system is the same as that illustrated in FIG. 1, but it should be noted that the "user" in the second embodiment is a mechanic and the user terminal 200 is a terminal that is used by the mechanic.

Further, in the first embodiment, manipulations desired not to be performed by the user are stored in a predetermined manipulation list, whereas in the second embodiment, manipulations desired to be performed by the user (mechanic) are stored in the predetermined manipulation list. Examples of manipulations to be performed in maintenance work include pickup of a vehicle (opening of a door or startup of an engine), arrival at a maintenance factory, opening of a bonnet, execution of inspection using a scanning tool, and return of the vehicle.

In the first embodiment, when the manipulation included in the predetermined manipulation list has been performed, a warning to the user, an additional billing process, or the like is executed. However, in the second embodiment, since the manipulation included in the predetermined manipulation list is a manipulation desired to be performed, solely a notification to the owner is performed and the warning to the user or the additional billing process is not executed when the manipulation has been performed.

Figure 7:
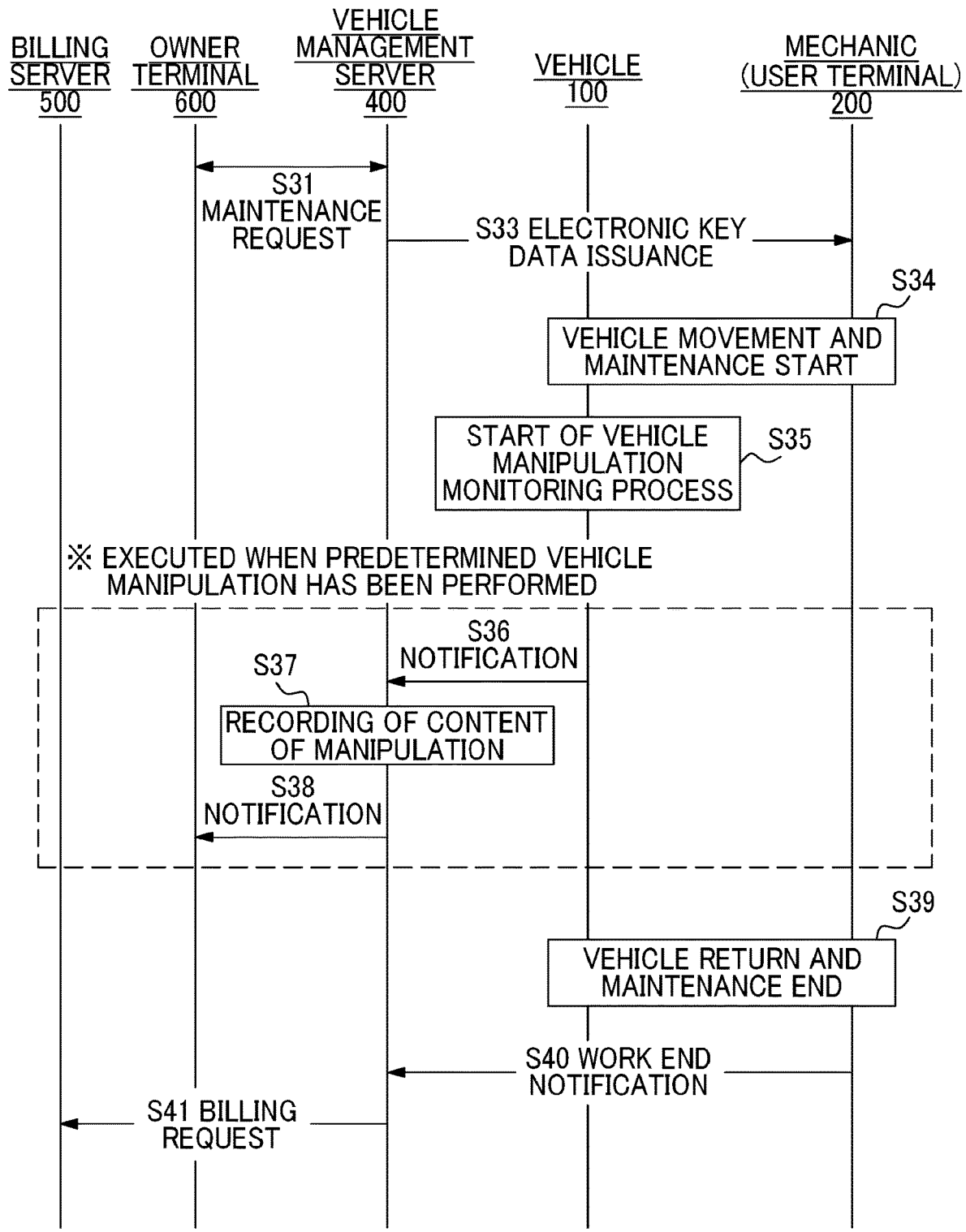
FIG. 7 is a sequence diagram illustrating a flow of an overall process in a vehicle rental system according to a second embodiment.

FIG. 7 is a diagram illustrating a flow of an overall process in this embodiment. First, in step S31, the owner accesses the vehicle management server 400 using the owner terminal 600 and requests maintenance of the vehicle 100. The maintenance request includes a mechanic that is a request destination, a time on which the maintenance is to be performed, a vehicle manipulation to be performed at the time of maintenance, and the like. The above-described content corresponds to the rental conditions in the first embodiment.

In step S33, the vehicle management server 400 issues electronic key data to the user terminal 200. In step S34, the mechanic goes to the house of the owner to pick up the vehicle, starts up the engine of the vehicle 100 using the electronic key of the user terminal 200, moves the vehicle to the maintenance factory, and starts the maintenance.

In step S35, a process of monitoring vehicle manipulations in the vehicle 100 is started. More specifically, the vehicle 100 monitors whether or not a manipulation performed with respect to the vehicle 100 corresponds to the vehicle manipulation defined in the predetermined manipulation list. When a predetermined vehicle manipulation has been performed with respect to the vehicle 100, step S36 and subsequent processes (processes in a portion surrounded by a dotted line) are performed.

In step S36, the vehicle 100 notifies the vehicle management server 400 that the manipulation defined in the predetermined manipulation list has been performed. The vehicle management server 400 records the predetermined manipulation performed in step S37 and notifies the owner terminal 600 that the predetermined manipulation has been performed with respect to the vehicle 100 in step S38. The processes of steps S36 to S38 are executed each time a predetermined manipulation is performed with respect to the vehicle 100.

When the mechanic causes the vehicle 100 to return and ends the maintenance process in step S39, the mechanic notifies the vehicle management server 400 that the maintenance work has ended, using the user terminal 200 in step S40. The vehicle management server 400 receives the notification and requests the billing server to perform billing for the owner in step S41. In this case, the amount to be charged is decided based on whether or not a work item defined in advance has actually been performed.

Functional Configuration

Since the functional configuration of each device in the present embodiment is basically the same as that of the first embodiment (see FIGS. 3 and 4), repetitive description thereof will be omitted.

Process

Figure 8:
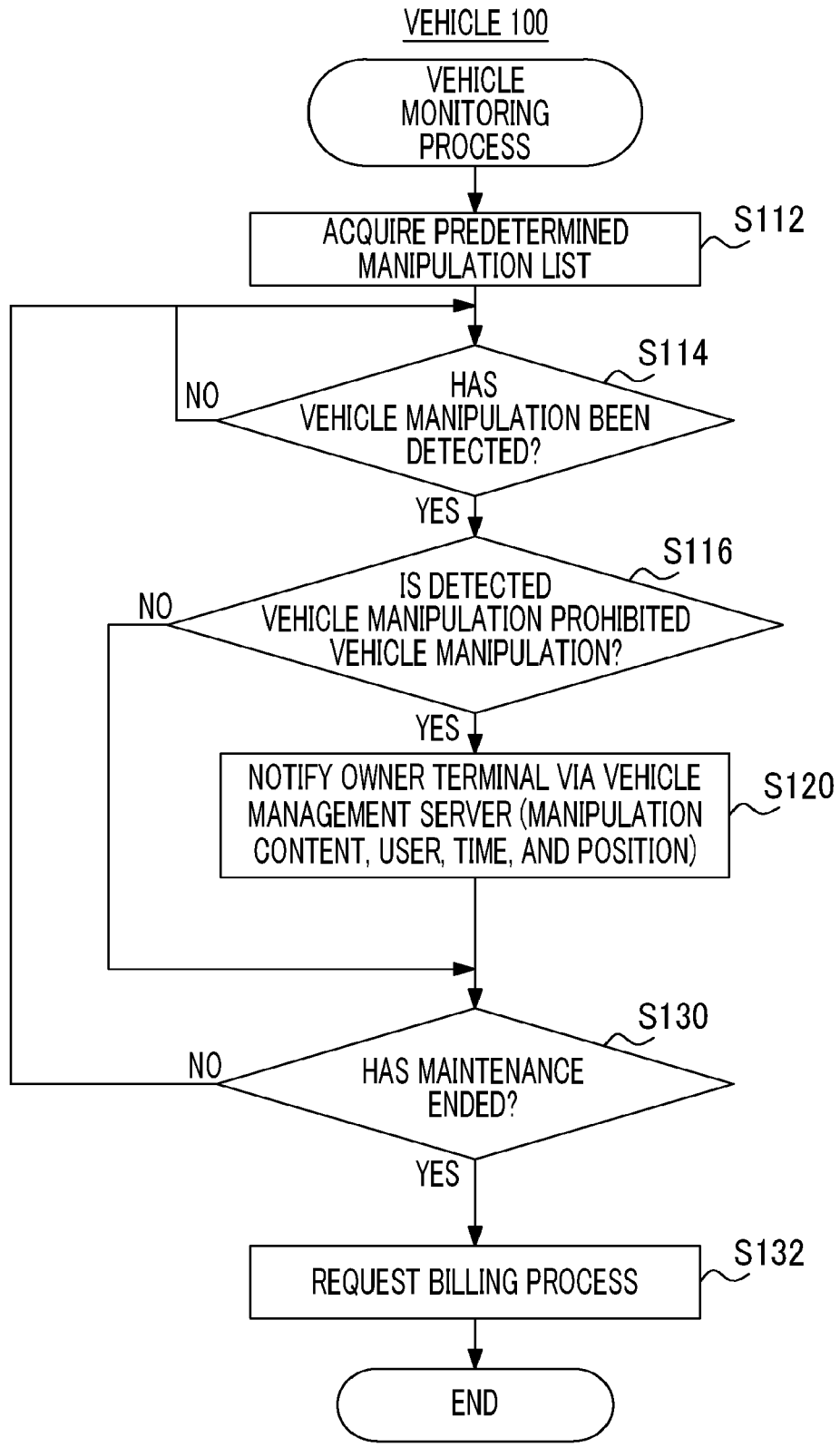
FIG. 8 is a flowchart showing a flow of a vehicle monitoring process of a vehicle according to the second embodiment.

A monitoring process for a vehicle in the second embodiment will be described with reference to FIG. 8. A process of a flowchart illustrated in FIG. 8 is executed when the mechanic is using the vehicle 100 using the electronic key data of the user terminal 200. The same processes as those in the first embodiment are denoted by the same reference numerals.

Steps S112 to S116 are the same as those in the first embodiment. When the use of the vehicle 100 by the mechanic is started, the manipulation list acquisition unit 122 acquires the predetermined manipulation list (S112). When the vehicle manipulation is detected (YES in S114), a determination is made as to whether or not the detected vehicle manipulation is the manipulation included in the predetermined manipulation list (S116).

When the detected vehicle manipulation is the manipulation included in the predetermined manipulation list (YES in S116), the notification unit 175 notifies the owner terminal 600 that the predetermined manipulation has been performed, via the vehicle management server 400. The notification includes content of a performed vehicle manipulation, a user who has performed the vehicle manipulation, and a position and time at which the vehicle manipulation has been performed.

It should be noted that when the vehicle management server 400 receives the notification from the vehicle 100, the vehicle management server 400 performs a notification to the owner terminal 600 and stores the performed manipulation in the storage unit.

In step S130, the controller 170 determines whether or not the maintenance has ended. The end of the maintenance work may be determined in any way. For example, a notification of the end of the maintenance work may be performed from the user terminal 200 to the vehicle 100 or the end of the maintenance work may be determined when the vehicle 100 is present at a return position. When the maintenance work of the vehicle 100 is continuing (NO in S130), the process returns to step 5114. When the maintenance work has ended (YES in S130), the controller 170 requests the vehicle management server 400 to perform a billing process.

When the vehicle management server 400 receives the request, the vehicle management server 400 decides the amount to be charged in consideration of the vehicle manipulation actually performed by the mechanic and performs a billing request to the billing server 500. For example, the vehicle management server 400 may store a fee for each vehicle manipulation (work) and decide the amount to be charged according to the actually performed work. Alternatively, although the vehicle management server 400, for example, charges a fee when all the vehicle manipulations included in the predetermined manipulation list have been performed, the vehicle management server 400 may charge a smaller amount than a regular fee when some of the vehicle manipulations included in the predetermined manipulation list have not been performed.

Advantageous Effects of Second Embodiment

According to the second embodiment, the owner sending the vehicle 100 for maintenance can receive a notification indicating that the maintenance work is being performed and ascertain whether or not all of predetermined works (vehicle manipulations) have been executed, and therefore, a sense of security can be obtained. In addition, since charging according to actually performed work is automatically performed, a charging process of the mechanic is simplified and satisfaction of the owner is improved.

Modification Example 2-1

Although the notification to the owner is performed each time the predetermined manipulation is performed in the second embodiment, the notification may be collectively performed at a predetermined timing, similar to Modification Example 1-2 of the first embodiment. For example, for the predetermined timing, a point in time when the maintenance work has ended, a point in time when the vehicle 100 has reached a return position, a point in time when the owner has transmitted a request from the owner terminal, or the like can be adopted.

Modification Example 2-2

Although the determination as to whether or not the manipulation performed with respect to the vehicle 100 corresponds to the predetermined manipulation is performed by the vehicle 100 in the second embodiment, the above-described determination may be performed by the vehicle management server 400, similar to Modification Example 1-3 of the first embodiment. In order to do as described above, the vehicle manipulation detected in the vehicle 100 may be transmitted to the vehicle management server 400 through wireless communication.

Other Embodiments

The first and second embodiments may be combined, manipulations desired not to be performed by the user and manipulations desired to be performed by the user may be defined, and the process described in the first embodiment or the second embodiment may be performed according to the detected vehicle manipulation.

Further, in the above embodiment, the key unit 110 is interposed between the user device (user terminal 200) and the collation unit 130. However, the user device may directly control the vehicle by performing wireless communication with the collation unit 130.

Although a control target using the electronic key is a vehicle in the above description, the control target may be any device as long as the device is movable (including being carried) and whether or not to the device is available can be controlled using the electronic key. Examples of such a device may include a robot, an airplane (including an unmanned aerial vehicle), a ship, and a computer.

What is claimed is:

1. A vehicle management system comprising:
an acquisition unit configured to acquire a manipulation list including one or a plurality of vehicle manipulations set when electronic key data of a vehicle is issued to a user device;
a detection unit configured to detect that the vehicle manipulation included in the manipulation list has been performed when the vehicle is being used using the electronic key data of the user device; and
a notification unit configured to notify an owner terminal related to an owner of the vehicle that the vehicle manipulation included in the manipulation list has been performed, after the detection of the detection unit.

2. The vehicle management system according to claim 1, wherein the notification unit is configured to perform a notification to the owner terminal each time the vehicle manipulation included in the manipulation list is performed when the vehicle is being used using the electronic key data of the user device.

3. The vehicle management system according to claim 1, further comprising a storage unit configured to store the vehicle manipulation detected by the detection unit,
wherein the notification unit is configured to collectively notify the owner terminal of the vehicle manipulations stored in the storage unit at a predetermined timing.

4. The vehicle management system according to claim 3, wherein the predetermined timing is at least one of a time when all of the vehicle manipulations included in the manipulation list have been performed, a time when the vehicle has reached a predetermined position, and a time when the vehicle management system has received a notification request.

5. The vehicle management system according to claim 1, wherein the notification unit is configured to notify the owner terminal of a time and position at which the vehicle manipulation has been performed.

6. The vehicle management system according to claim 1, further comprising a billing processing unit configured to perform a billing process on a user of the user device after the detection of the detection unit.

7. The vehicle management system according to claim 1, wherein the vehicle manipulation includes at least one of startup of a driving source, start of a movement, opening and closing of an opening and closing body of the vehicle, use of a facility inside the vehicle, and dangerous driving.

8. A vehicle management method that is performed by a vehicle management system, the vehicle management method comprising:
acquiring a manipulation list including one or a plurality of vehicle manipulations set when electronic key data of a vehicle is issued to a user device;
detecting that the vehicle manipulation included in the manipulation list has been performed when the vehicle is being used using the electronic key data of the user device; and
notifying an owner terminal related to an owner of the vehicle that the vehicle manipulation included in the manipulation list has been performed, after the detection.

9. A computer-readable non-transitory storage medium storing a program causing a computer to execute
acquiring a manipulation list including one or a plurality of vehicle manipulations set when electronic key data of a vehicle is issued to a user device,
detecting that the vehicle manipulation included in the manipulation list has been performed when the vehicle is being used using the electronic key data of the user device, and
notifying an owner terminal related to an owner of the vehicle that the vehicle manipulation included in the manipulation list has been performed, after the detection.

10. A vehicle management system comprising:
circuitry configured to:
acquire a manipulation list including one or a plurality of vehicle manipulations set when electronic key data of a vehicle is issued to a user device;
detect that the vehicle manipulation included in the manipulation list has been performed when the vehicle is being used using the electronic key data of the user device; and
notify an owner terminal related to an owner of the vehicle that the vehicle manipulation included in the manipulation list has been performed, after the detection.

11. The vehicle management system according to claim 10, wherein the circuitry is configured to perform a notification to the owner terminal each time the vehicle manipulation included in the manipulation list is performed when the vehicle is being used using the electronic key data of the user device.

12. The vehicle management system according to claim 10, wherein the circuitry is configured to:
store the detected vehicle manipulation, and
collectively notify the owner terminal of the stored vehicle manipulations at a predetermined timing.

13. The vehicle management system according to claim 12, wherein the predetermined timing is at least one of a time when all of the vehicle manipulations included in the manipulation list have been performed, a time when the vehicle has reached a predetermined position, and a time when the vehicle management system has received a notification request.

14. The vehicle management system according to claim 10, wherein the circuitry is configured to notify the owner terminal of a time and position at which the vehicle manipulation has been performed.

15. The vehicle management system according to claim 10, wherein the circuitry is configured to perform a billing process on a user of the user device after the detection.

16. The vehicle management system according to claim 10, wherein the vehicle manipulation includes at least one of startup of a driving source, start of a movement, opening and closing of an opening and closing body of the vehicle, use of a facility inside the vehicle, and dangerous driving.

* * * * *